(12) United States Patent
Sandler et al.

(10) Patent No.: US 6,378,069 B1
(45) Date of Patent: Apr. 23, 2002

(54) APPARATUS AND METHODS FOR PROVIDING SOFTWARE UPDATES TO DEVICES IN A COMMUNICATION NETWORK

(75) Inventors: Howard M. Sandler; Leo Strawczynski, both of Ottowa (CA); José M. Duran, Paris (FR); Bernard Thiboutot, Hull (CA); Okan Azmak, Morris Plains, NJ (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/186,349

(22) Filed: Nov. 4, 1998

(51) Int. Cl.[7] .................................................. G06F 1/24
(52) U.S. Cl. ........................ 713/153; 713/168; 713/190; 713/193; 380/255
(58) Field of Search ................................ 380/255, 257; 713/153, 168, 190, 193, 200, 201

(56) References Cited

U.S. PATENT DOCUMENTS 6,128,389 A * 10/2000 Chan et al. ................. 380/247
6,199,045 B1 * 3/2001 Giniger et al. ................. 705/1
6,208,627 B1 * 3/2001 Menon et al. .............. 370/328

* cited by examiner

*Primary Examiner*—Thomas R. Peeso
(74) *Attorney, Agent, or Firm*—Cobrin & Gittes (57) ABSTRACT

An apparatus for transmitting software to a subscriber device in a communication network, which includes a processor, a database coupled to the processor, and a communication device for providing software to a subscriber device. The database contains information about subscribers of a communication network. A method for transmitting software to subscriber devices in a communication network, comprising identifying a subscriber device which requires a software update, transmitting a first signal from a processor to the subscriber device, initiating a communication channel between the subscriber device and the processor, and transmitting a second signal to the subscriber device. The second signal contains software.

52 Claims, 6 Drawing Sheets

APPARATUS AND METHODS FOR PROVIDING SOFTWARE UPDATES TO DEVICES IN A COMMUNICATION NETWORK

FIELD OF INVENTION

The present invention pertains to apparatus and methods for providing software updates to devices in a communication network and, in particular, to apparatus and methods for providing secure and unobtrusive software updates over-the-air in a digital wireless communication network.

BACKGROUND OF THE INVENTION

In networks which include a large number of remote network elements, terminals, or telephones, which are located on customer premises and which typically operate pursuant to software, it is often necessary to update the software stored therein or utilized in conjunction therewith. The need to update the software in a large number of these network elements, terminals or telephones could arise, for example, if a defect is discovered in the software or if a new feature is desired to be added or retrofitted thereto. In addition to software, the need may also arise to update software-controlled configurations, or operating characteristics, of such network elements, terminals or telephones.

Currently, software updating of these network elements, terminals, or telephones is typically performed manually, with a service person typically visiting the customer premises in order to load or to install the new software from a storage device or computer, or by the customer being requested to bring the network element, terminal, or telephone to a service facility. The above-described methods are typically slow, costly, and inconvenient. A more desirable method for performing software updating is to utilize the communication network itself as a distribution medium via which the software can be distributed from a centralized location or facility associated with the network. A centralized distribution system serves to avoid the need to send service personnel to physically access each network element, terminal, or telephone at the subscriber's premises or locally, or the need for customers to bring their devices to a service facility.

The distribution of software utilizing a communication medium typically requires that a number of concerns be addressed in a satisfactory manner. Typically, the download system should be efficient in its use of system bandwidth, with the practice of dedicating a wideband channel for use in software downloading being avoided. Further, each software download session should be completed as soon as possible so as to prevent tying up limited network resources and equipment at, and associated with, the centralized distribution computer.

Software download sessions should also be non-blocking so that the user will not be prevented from using or accessing the communication system while a software download operation is in progress. In some cases, regulatory requirements may dictate that communication systems be non-blocking, such as, for example, in cases of systems which are relied upon for emergency communications.

The software download process should also be secure, and include means and methods for ensuring that software is not corrupted before it is run. Further, there should always be valid software available for operation. Means and methods are also required in order to ensure that only authorized versions of software are accepted by the respective network elements terminals, or telephones.

In UK Patent Application GB 2301747 A, Kay discloses a remotely programmable subscriber terminal in a wireless telecommunication system. In the system disclosed by Kay, the communications link to the subscriber terminal consists of four logical channels, which include two channels for bearer information for the user, each being 64 kb/s, a signaling channel at 16 kb/s, and an overhead channel at 16 kb/s, which is utilized for control information. Software is passed to the subscriber terminal over the overhead channel. It is possible for telephone calls to be made using the bearer channels during a download procedure. The disadvantages of this method lie in the fact that the overhead channel is typically slower than the bearer channel. As a result, the download session will be longer than would otherwise be required if a bearer channel were to be used to pass the software.

Kay further discloses a method for ensuring that software, which is corrupted by errors, is not run, and that there is always valid software available to be utilized. This involves the provision of dual non-volatile (flash) memory banks in the terminal. Downloaded software is written into one memory while the program stored in the other memory is being run. Code checksums are utilized so as to ensure that no software errors exist before it is run. The deficiency of this method is that there is no means described for ensuring that downloaded software is authentic. For example, a malicious "hacker" could potentially initiate a download session with a subscriber network, terminal, or telephone, and transfer a software load, including a code checksum which is valid for that software load.

In U.S. Pat. No. 4,982,430, Frezza et al. discloses a security arrangement which is utilized in a system whereby a large number of terminals, connected to a coaxial cable system, receive software downloads. The centralized server computes a checksum on at least a part of the software to be downloaded, encrypts this checksum with a secret key, and sends the encrypted checksum, along with the software, to the terminal. The terminal calculates a checksum on the received software and also decrypts the received encrypted checksum, using the secret key, which it stores.

If the decrypted checksum matches the calculated checksum, the software is deemed to be authentic. The disadvantage of this method lies in the fact that the terminal must store the secret key which is utilized for encryption at the centralized server. If a malicious "hacker" were to disassemble or otherwise examine the memory banks of a subscriber terminal, the secret key would become known and the hacker could then generate false software loads. If the same secret key were to be used for a large number of subscriber terminals, the security of the system would be compromised.

SUMMARY OF THE PRESENT INVENTION

The present invention provides apparatus and methods for providing secure and unobtrusive software updates to devices in a communication network which overcomes the shortcomings of the prior art.

The apparatus of the present invention includes a processor, a database which contains information regarding subscribers of a communication network, and a communication device. The communication device transmits software from the processor to a subscriber device in a communication network.

The apparatus of the present invention may also include a processor, for transmitting software to a subscriber device. The processor may further include a controller, for controlling the processor, a storage device for storing information regarding subscribers of a communication network, and a communication device for transmitting software from the processor to a subscriber device.

The processor may identify a subscriber device in a communication network which requires a software update. A first signal may then be transmitted from the processor to the subscriber device. A communication channel between the subscriber device and the processor is then initiated. Thereafter, a second signal which contains software can be transmitted from the processor to the subscriber device over a communication network, in order to effectuate a software update at the subscriber device.

Accordingly, it is an object of the present invention to provide apparatus and methods for providing software updates to devices in a communication network.

It is another object of the present invention to provide apparatus and methods for providing software updates over-the-air to devices in a digital wireless communication network.

It is yet another object of the present invention to provide apparatus and methods for downloading software to network elements, terminals, or telephones, in a communication network.

It is still another object of the present invention to provide apparatus and methods for downloading software to network elements, terminals, or telephones, in a communication network, wherein software is transferred over a bearer channel of a communication link.

It is another object of the present invention to provide apparatus and methods for downloading software to network elements, terminals, or telephones, in a communication network, in a time efficient manner.

It is yet another object of the present invention to provide apparatus and methods for providing software updates to network elements, terminals, or telephones, in a communication network, wherein the network elements, terminals, or telephones, perform verification of the authenticity of the software before accepting same.

It is still another object of the present invention to provide apparatus and methods for providing software updates to network elements, terminals, or telephones, in a communication network wherein encryption and cryptographic techniques are utilized and/or are incorporated for facilitating security.

It is yet another object of the present invention to provide apparatus and methods for providing software updates to network elements, terminals, or telephones without affecting access to the communication channel.

Other objects and advantages of the present invention will be apparent to those skilled in the art upon a review of the Description of the Preferred Embodiment taken in conjunction with the Drawings which follow.

BRIEF DESCRIPTION OF THE DRAWINGS

The present invention will be more clearly understood by reference to the following description of an exemplary embodiment in conjunction with the accompanying Drawings, in which.

DESCRIPTION OF THE PREFERRED EMBODIMENT

Figure 1:
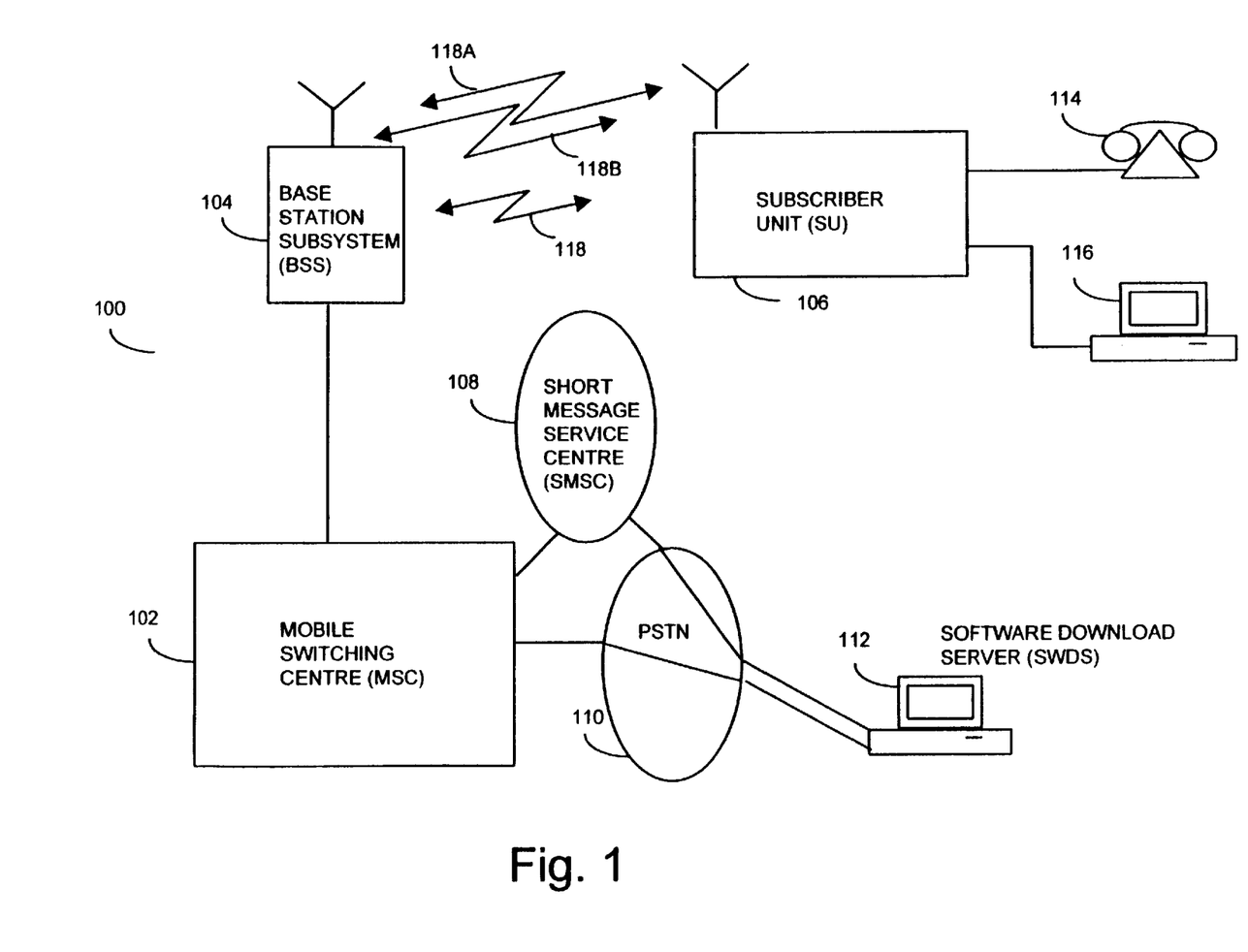
FIG. 1 illustrates the apparatus of the present invention, in block diagram form.

FIG. 1 illustrates the apparatus of the present invention, in block diagram form. The apparatus, which is designated by the reference numeral 100, in the preferred embodiment, is a digital wireless network. Although described as being utilized in conjunction with a digital wireless network, those skilled in the art will recognize and appreciate that the present invention may be utilized in conjunction with any type of communication network or system. The apparatus 100 includes a mobile switching center or computer (MSC) 102, a base station subsystem or device (BSS) 104, and a subscriber unit or device (SU) 106.

The apparatus 100 also includes a public switched telephone network (PSTN) 110, a short message service center or computer (SMSC) 108 and a software download server or computer (SWDS) 112. The apparatus 100 also includes, at the subscriber unit or device 106, a telephone 114 and/or a computer 116. In the preferred embodiment, the apparatus 100 includes a plurality of subscriber units 106.

The mobile switching center (MSC) 102 routes calls between the subscriber units 106 and the public switched telephone network 110. The mobile switching center 102 is connected to one or more base station subsystems 104, for providing radio signaling to and from the subscriber units 106 which are located in their vicinity. Each subscriber unit 106 can connect to end-user terminal equipment such as a telephone 114 or a computer 116. Alternatively, the subscriber unit 106 can include a terminal device such as a mobile telephone. The base station subsystem 104 communicates with the subscriber unit 106 over the communication link 118.

In certain types of digital wireless networks, such as Global System for Mobility (GSM) networks, the radio link 118 between the base station subsystem 104 and subscriber unit 106 will contain a bearer channel 118A which conveys the user speech or data information, as well as an associated signaling channel 118B, for conveying call control and short messages such as alphanumeric paging messages. The bitstreams which represent these two channels are time-multiplexed together on the same physical communication link, and both are simultaneously available for communication. In the preferred embodiment, the communication link is a radio link. Typically, the bandwidth or transmission rate of the associated signaling channel is much less than that of the bearer channel, so as to reduce overall bandwidth requirements.

In GSM networks, one purpose for the associated signaling channel is to convey short messages of typically less than 140 bytes. Short messages which are sent to the subscriber units 106 in the apparatus 100 are input to the mobile switching center 102 from a short message service center 108. Short messages may be originated by external parties which communicate with the short message service center 108 via, for example, electronic mail sent through the internet or the Internet, or by a modem connection through the PSTN 110, as shown.

Figure 2:
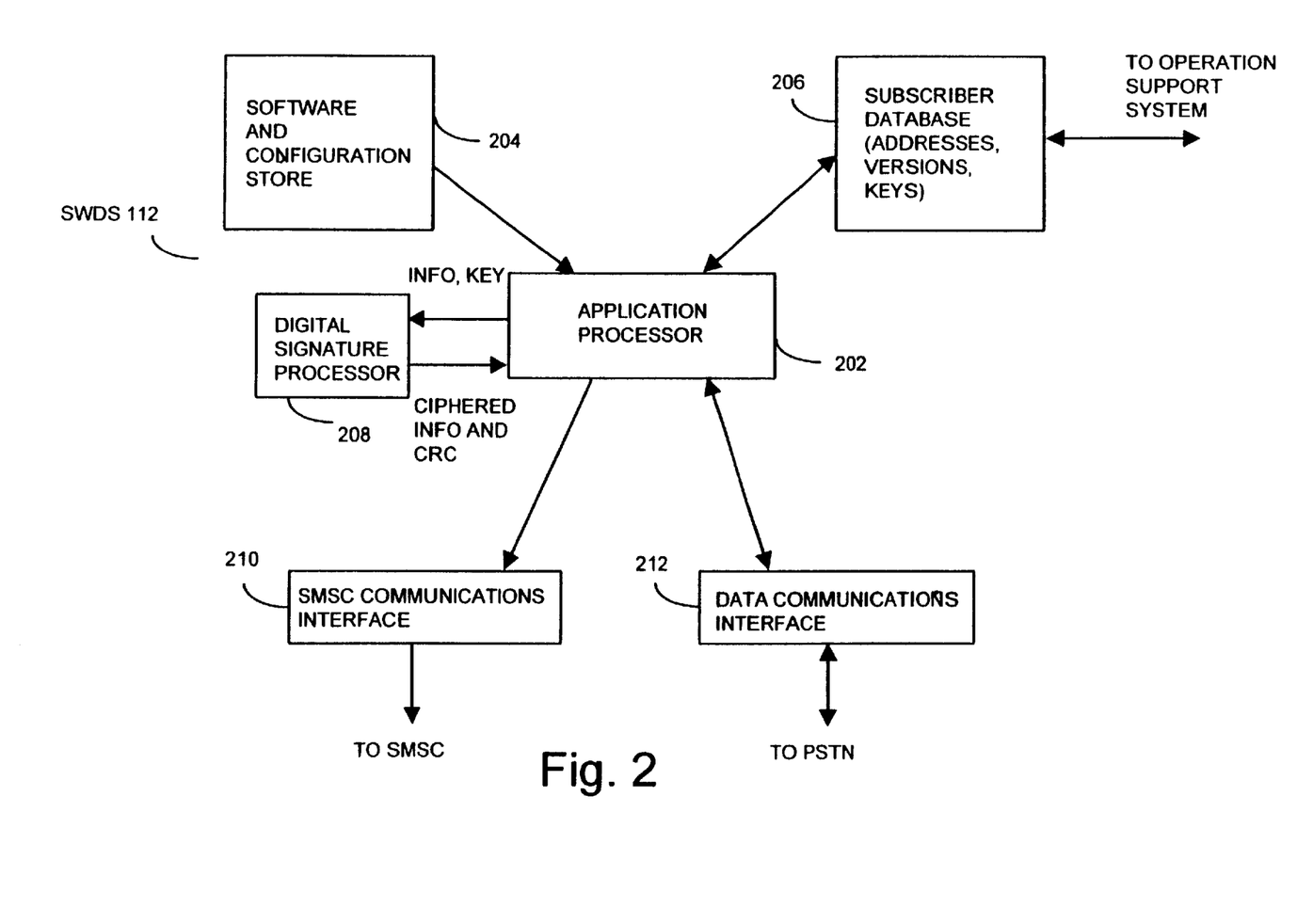
FIG. 2 illustrates the software download server of FIG. 1 illustrating the components thereof in block diagram form.

FIG. 2 illustrates the software download server (SWDS) 112, which is utilized in the present invention, in block diagram form. The software download server 112 includes an application processor 202 which executes and coordinates the tasks required of the software download server 112. The processor 202 may be implemented, in the preferred embodiment, with a microprocessor which operates pursuant a software program. The software download server 112 also includes a subscriber database 206, a software and configuration storage device 204, a digital signature processor 208, an SMSC communications interface device (I/F) 210 and a data communications I/F 212.

The application processor 202 has access to the subscriber database 206, which identifies the list of subscribers who require software downloads. The subscriber database 206 contains a record for each subscriber. The record includes the network address for the subscriber. When the application processor 202 originates a short message identifying that address, the short message will reach the intended subscriber's subscriber unit. The record also identifies the current version of software and/or configuration information in the subscriber's subscriber unit 206, as well as the version which the subscriber is due to receive. Private keys, which are associated with the software and/or configurations of the subscriber, are also stored in the record. In an alternate embodiment, the private keys could be stored in the software and configuration store 204 if they are not subscriber-specific.

The software and configuration storage device 204 is an archive of all versions of software and configuration files which might potentially be required to be downloaded to some of the subscriber units 206. The software and configuration store 204 can be realized or implemented with any number of storage media, including magnetic disks, tape, optical compact disks or other appropriate storage devices or media.

The application processor 202 transmits information which is to be digitally signed, along with a private key, to the digital signature processor 208. The digital signature processor 208 first computes a checksum, such as a cyclic redundancy check (CRC) on the information to be signed. The digital signature processor 208 then encrypts the information along with the CRC using the private key, according to an encryption algorithm such as the RSA algorithm. The RSA algorithm which is utilized is described in "On a Method for Obtaining Digital Signatures and Public Key Cryptosystems", by R. L. Rivest, A. Shamir, and L. Adelman, Communications of the ACM, Vol. 21, pp. 120–126, February 1978, the subject matter of which is hereby incorporated by reference herein. The ciphered information and the CRC are then passed back to the application processor 202. The digital signature processor 208 could be realized physically using the same microprocessor which performs the application processor 202 function. In this regard, the application processor 202 could, in an alternate embodiment, be programmed to perform the functions of the digital signature processor 208.

In an alternate embodiment, the entire set of information would not be encrypted, but rather, only a shorter message digest of the information would be encrypted. An example of a suitable message digest is the CRC which is calculated on the information which is to be signed. In some cases, the encryption algorithm may require a longer message digest. In this instance, the message digest could consist of the CRC which is calculated on the message which is to be signed and concatenated with a sample of the message in order to add more bits thereto. In another alternate embodiment, the message digest would be a hash function which can be computed on the information which is to be signed.

The short message service center communication I/F device 210 may contain an internet connection or an Internet connection, whereby messages may be sent to the short message service center 108 in the form of electronic mail (e-mail) or file transfers. Alternatively, the short message service center communications I/F 210 could be a voiceband modem which communicates with the short message service center 108 via a dial-up line through the PSTN 110. In the preferred embodiment, a two-way communication link is established between the short message service center communication I/F 210 and the short message service center 108. The short message service center 108 can send acknowledgments back to the software download server 112 in order to indicate whether short messages were received by the subscriber units 106.

The software download server 112 also includes the data communication I/F or device 212 for downloading software and/or configuration files to the subscriber units 206. Typically, a download would take place using a circuit-switched data connection. The data communications interface 212 may be a voiceband modem or a pool of such modems. It should be noted that the short message service center communications I/F or device 210 and the data communications I/F or device 212 could, in an alternate embodiment, be consolidated into one and the same modem or modem pool. The data connection utilized in conjunction with the short message service center communications I/F 210 and the data communication I/F 212 could be packet-switched data.

Figure 3:
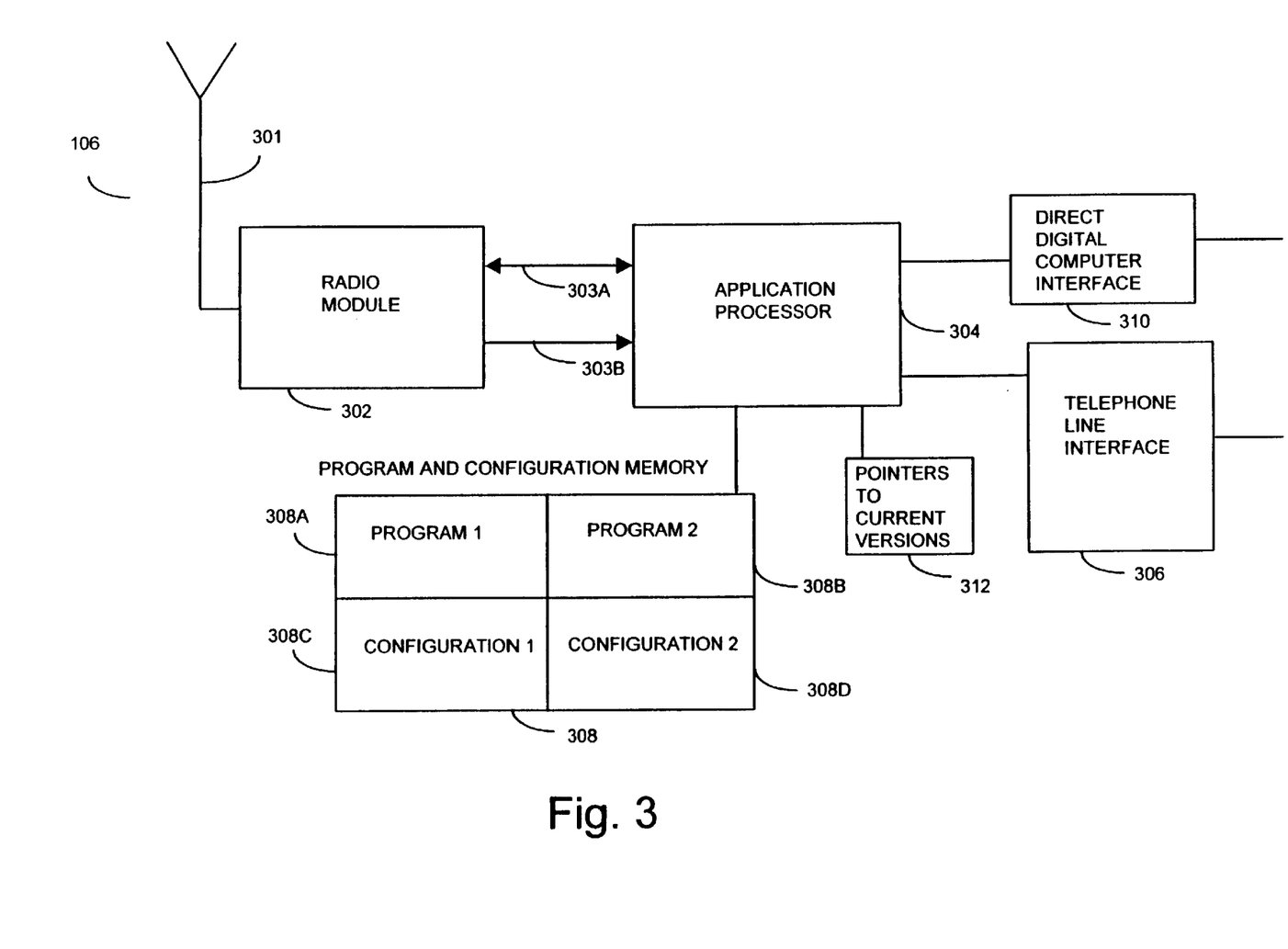
FIG. 3 illustrates the subscriber unit of FIG. 1 illustrating the components thereof, in block diagram form.

FIG. 3 illustrates the subscriber unit 106, which is utilized in the present invention, in block diagram form. The subscriber unit 106 includes an antenna 301, a radio module 302, an application processor 304, a direct digital computer interface device 310, a telephone line interface device 306, a pointing device 312, which contains pointers to current program and configuration versions, and a program and configuration memory 308. The digital radio module device 302 connects to the antenna 301 and communicates with the base station subsystem 104. The radio module 302 modulates and demodulates the information and provides both the bearer channel information 303A and the associated signaling channel information 303B to the application processor 304.

The application processor 304, which is typically a microprocessor, coordinates and controls all of the functions of the subscriber unit 106. The application processor 304 translates digitized speech information, which is carried in the bearer channel 303A, into the format used by the telephone line interface 306. The application processor 304 can also generate digitized signal information for the telephone line interface, such as digitized samples of dial tones. The application processor 304 also monitors and controls the telephone line interface 306. The telephone line interface 306 converts digitized speech information into an analog signal and provides the same interface as a telephone loop (on-hook voltage, off-hook loop current, power ringing signal, etc.). The direct digital computer interface 310, which may be implemented by a RS-232 type serial port, allows digital bearer channel information to be passed on to an end terminal, such as, for example, a personal computer. Applicant hereby incorporates by reference herein the subject matter of U.S. patent application Ser. No. 08/667,569, which is assigned to the assignee of the present invention.

The application processor 304 executes a stored program and its function may also be altered according to a program and/or program constraints which may be stored in a configuration file in memory 308. In the preferred embodiment, application processor 304 operates from a program code and data stored in a configuration memory 308.

In the preferred embodiment of the present invention, the program portion of the program and configuration memory 308 is divided into two portions or programs which include Program 1 308A and Program 2 308B. Each one of Program 1 or Program 2 has sufficient capacity to store an entire operating program. While one version is in active use, the other is available to be overwritten by newly downloaded software. The configuration portion of the program and configuration memory 308 is divided into two portions, which include Configuration file 1 308C and Configuration file 2 308D, each of which has sufficient capacity to contain a complete configuration file. While one configuration file is in active use, the other portion of the memory is available to be overwritten by a new configuration file.

A set of pointers which are stored in the memory 312 indicate to the application processor 304 which of the Programs 1 or 2, and which of the Configuration files 1 or 2, are the current active programs or files. Upon reset, a boot program directs the application processor 304 to run software from the current active version of software memory, using configuration constants and/or constraints from the current active configuration file memory.

In an alternate embodiment, the pointer memory 312 may be incorporated into the program and configuration memory 308. In this embodiment, a software version pointer exists in both the software version memories 308A and 308B. Similarly, a configuration version pointer exists in both configuration memories 308C and 308D. In this embodiment, a flag in the newly-written memory could be set to a "1" in order to indicate that the software stored therein is the current software and, therefore, that the corresponding memory is the current active memory upon the conclusion of the download session. The corresponding flag in the other memory could be set to a "0" in order to indicate that the software therein is the out-dated version. This embodiment may be most advantageously utilized in embodiments which employ flash memories. While flash memories are normally overwritten in a block manner, the present invention facilitates the overwriting of the flash memory by simply changing the contents of a single memory location from a "1" to a "0". In this manner, the present invention dispenses with the need to overwrite an entire memory block. By simply setting the contents of the corresponding memory location to a "0", an entire version of the outdated software can be marked as outdated without having to overwrite the entire memory block.

Figure 4:
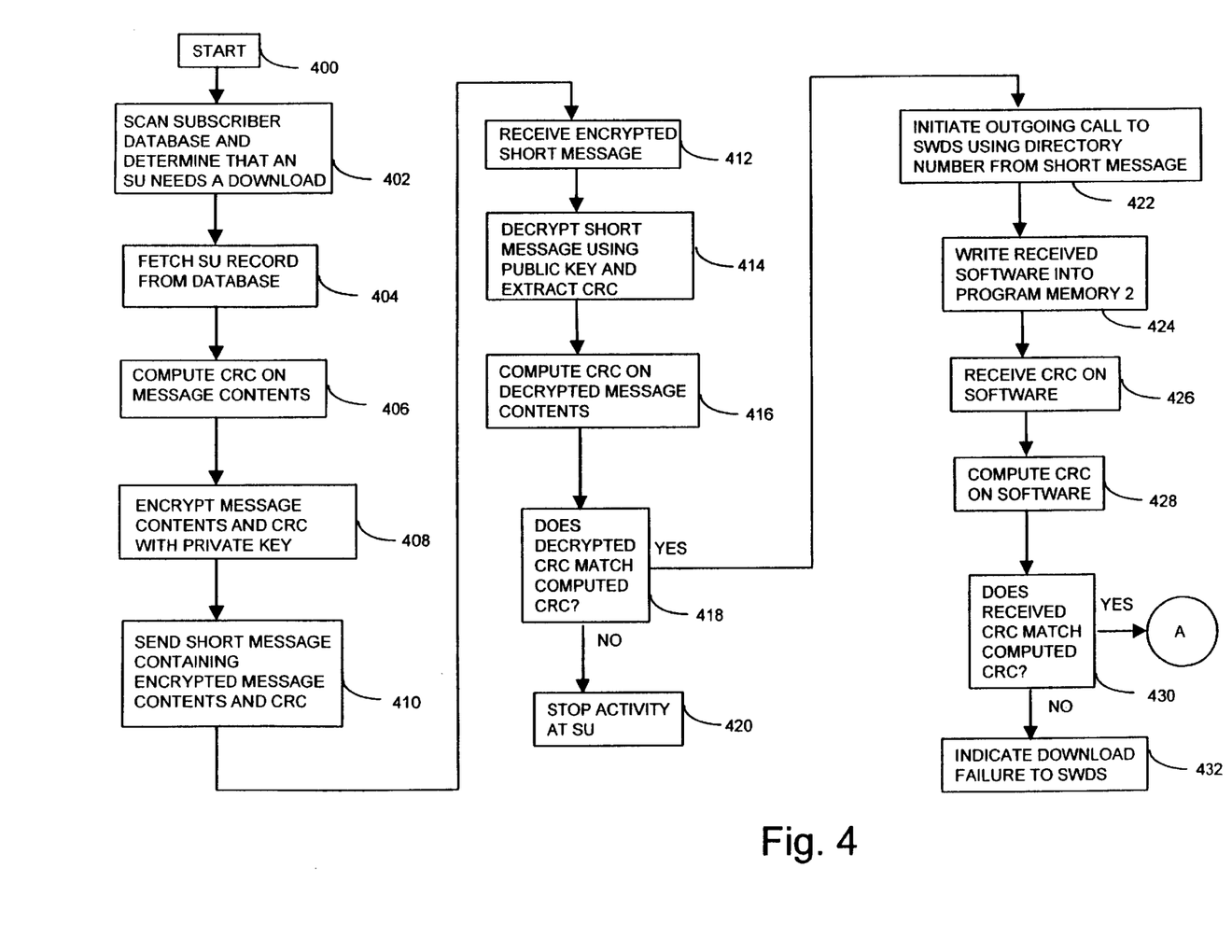
FIG. 4 is a flowchart illustrating the software download procedure which is performed by the apparatus of the present invention.

FIG. 4 is a flow chart illustrating the software download procedure, which is performed by the apparatus 100 of the present invention. The download procedure is typically initiated by the software download server 112. The download operation commences at step 400. At step 402, the application processor 202 in the software download server 112 scans the subscriber database 206 so as to determine which subscriber unit requires a download. This determination would occur, for example, if a subscriber record indicates that the subscriber has a certain version of software but requires a more up-to-date version.

At step 404, the application processor 202 in the software download server 112 obtains the subscriber record from the subscriber database 206. At step 406, information which is to be digitally signed is passed to the digital signature processor 208 along with a private key which is contained in the subscriber record. The information which is to be digitally signed is defined as the message contents. The message contents may include the network address of the subscriber unit, the directory number which the subscriber unit 206 is to call in order to reach the software download server 112, and a random number or sequential number which may be utilized to fill out the amount of information to a desired length.

In a preferred embodiment, it may be undesirable for the random number or the sequential number to be repeated for the same subscriber. It may also be undesirable for the random number or the sequential number to be repeated over a certain time interval or for a certain number of message transmissions. In this manner, the subscriber unit may be designed to reject short messages which may contain a number which the subscriber unit has previously received. This scheme may prevent a so-called "replay" security attack in which a malicious "hacker" may observe and record a previous short message and attempt to replay it to a subscriber at a later time, thereby attempting to prompt a response or other activity at the subscriber unit. The digital signature processor first computes a CRC on the message contents. At step 408, the digital signature processor 208 encrypts both the message contents and the CRC using the private key. The encrypted message and the CRC are then passed back to the application processor.

At step 410, the application processor 202 initiates the transmission of a short message to the subscriber unit 106. The short message contains the encrypted message and the CRC. The message is sent via the short message service center communications interface 210 to the short message service center 108, which sends it to the subscriber unit 106, via the mobile switching center 102 and the base station subsystem 104 over the associated signaling channel 118B.

In an alternate embodiment, the short message may be transmitted on other channels, such as, for example, on a packet radio channel(s) and/or on any other suitable communication channel(s).

At the subscriber unit 106, the short message is received at step 412. The message is then passed to the subscriber unit's application processor 304 via the associated signaling channel information link 303B. At step 414, the application processor 304 decrypts the encrypted message and the CRC by utilizing the public key which is stored in its currently active configuration file. Since the public key is stored in the configuration file, the public key can itself be updated by a configuration file download so as to enhance security. In this embodiment, the public key would be initially programmed into the configuration file at the time of manufacture and/or at the time of its initial placement into service.

At step 416, the application processor 304 computes a CRC on the decrypted message contents. At step 418, the application processor 304 compares the decrypted and the computed CRCs. If the decrypted and computed CRC match, such an instance would indicate the occurrence of an authentic download prompt message. If, however, the computed CRCs do not match, the message is deemed to be invalid and no further activity would occur at the subscriber unit 106. In addition, the subscriber unit 106 may log or record the occurrence of this event and report same to the software download server 112 during a subsequent session.

In an alternate embodiment, the digital signature processor 208 does not encrypt the entire message contents, at step 408, but rather, only a message digest is encrypted. In this instance, the short message, which is sent at step 410, may consist of the message content along with the encrypted message digest. At step 414, the application processor 304 may decrypt and extract the message digest using the public key. At step 416, the application processor 304 may compute a message digest on the message contents, and, at step 418, the application processor 304 may then compare the decrypted and the computed message digests. The algorithm may then resume operation as described herein.

If the prompt message is valid, activity at the subscriber unit 106 will continue at step 422. The subscriber unit 106 originates an outgoing circuit-switched data call to the PSTN directory number which is indicated in the contents of the short message. This call will terminate at the software download server 112 and the information will be downloaded.

In an alternate embodiment, the subscriber unit 106 originates an outgoing circuit switch data call to an Internet server thereby connecting to the software download server 112 at an Internet address. In yet another alternate embodiment, the subscriber unit 106 originates a packet-switched data call rather than a circuit-switched data call.

Authentication methods may be used to verify if the subscriber unit is a legitimate unit before the software download server 112 begins to transfer software to the subscriber unit. An example of an authentication technique would be a requirement for the subscriber unit 106 to provide a password to the software download server 112. A more elaborate authentication technique may include the software download server 112 issuing a random number challenge to the subscriber unit 106, the subscriber unit 106 encrypting the challenge with a secret private key which is stored in its configuration file, sending the encrypted challenge back to the software download server 112, and comparing the encrypted challenge which was received from the subscriber unit 106 to the challenge which was encrypted at the software download server 112 using a private key which corresponds to the subscriber unit 106. Any suitable authentication method may be utilized in conjunction with the apparatus and methods of the present invention.

Assuming that the purpose of the download is to provide a new software program to the subscriber unit 106 and that the current active version of program memory in the subscriber unit 106 is Program 1, at step 424, the received software file will be written into Program 2 memory at the subscriber unit 106 as it is received. The file transfer protocol which is utilized to download the information could be any one or more of a number of suitable protocols. Typically, such protocols send information in blocks. At the beginning of each block, the software download server 112 provides a start address, to which the block will be written in memory, and the length of the block. The start address and the length of the block will be followed by the actual information and then by a checksum.

Upon the conclusion of the information transfer from the software download server 112 to the subscriber unit 106, the software download server 112 sends a checksum, such as a CRC, on the entire downloaded software, which is received by the subscriber unit 106 at step 426. At step 428, the subscriber unit's application processor 304 computes a CRC on the entire downloaded software. At step 430, the subscriber unit's application processor 304 compares the received CRC with the computed CRC on the software file. If the received CRC and the computed CRCs do not match, the download is known to have failed. The subscriber unit 106 transmits an indication of this failure back to the software download server 112 at step 432. This transmission signaling activity takes place over the circuit-switched data connection, which is a two-way communication link.

If the received CRC and the computed CRC match, the algorithm continues, at step 434, in FIG. 4. The subscriber unit 106 signals to the software download server 112, at step 434, that the download has been successful. At step 436, the subscriber unit's application processor 304 changes the pointer in the non-volatile memory 312 so that it points to Program 2 as the active version to be used. A reset is then performed on the subscriber unit 106. When the subscriber unit 106 is reset, at step 438, the application processor 304 will run a boot program. In the preferred embodiment, the boot program will examine the pointer in order to ascertain the version of the application program from which it is to operate. Thereafter, the application processor 304 will begin execution of program 2. The boot program code may reside in the application processor 304 or in a portion of the program 1 memory 308A which is not overwritten, or which may always be overwritten by the boot program. In this case, the reset routine may begin execution of the boot routine in program 1 upon being reset.

At the software download server 112, the signal from the subscriber unit 106 which indicates software download success, is received, at step 440, and the application processor 304 in the software download server 112 updates the subscriber database 206 in order to indicate that the current version in the subscriber unit 206 is the new software version which was just downloaded.

A software download could fail for a number of reasons. These include the failure of the short message to reach the subscriber, corruption of the short message such that the decrypted and the computed CRCs do not match at the subscriber unit 106, failure of the subscriber unit 106 to call the software download server 112 due to the subscriber unit 106 being in use for a call, and failure of the file transfer protocol (invalid CRC on the transferred information). In any of these instances, the software download server 112 may re-attempt the software download at a later time.

Figure 5:
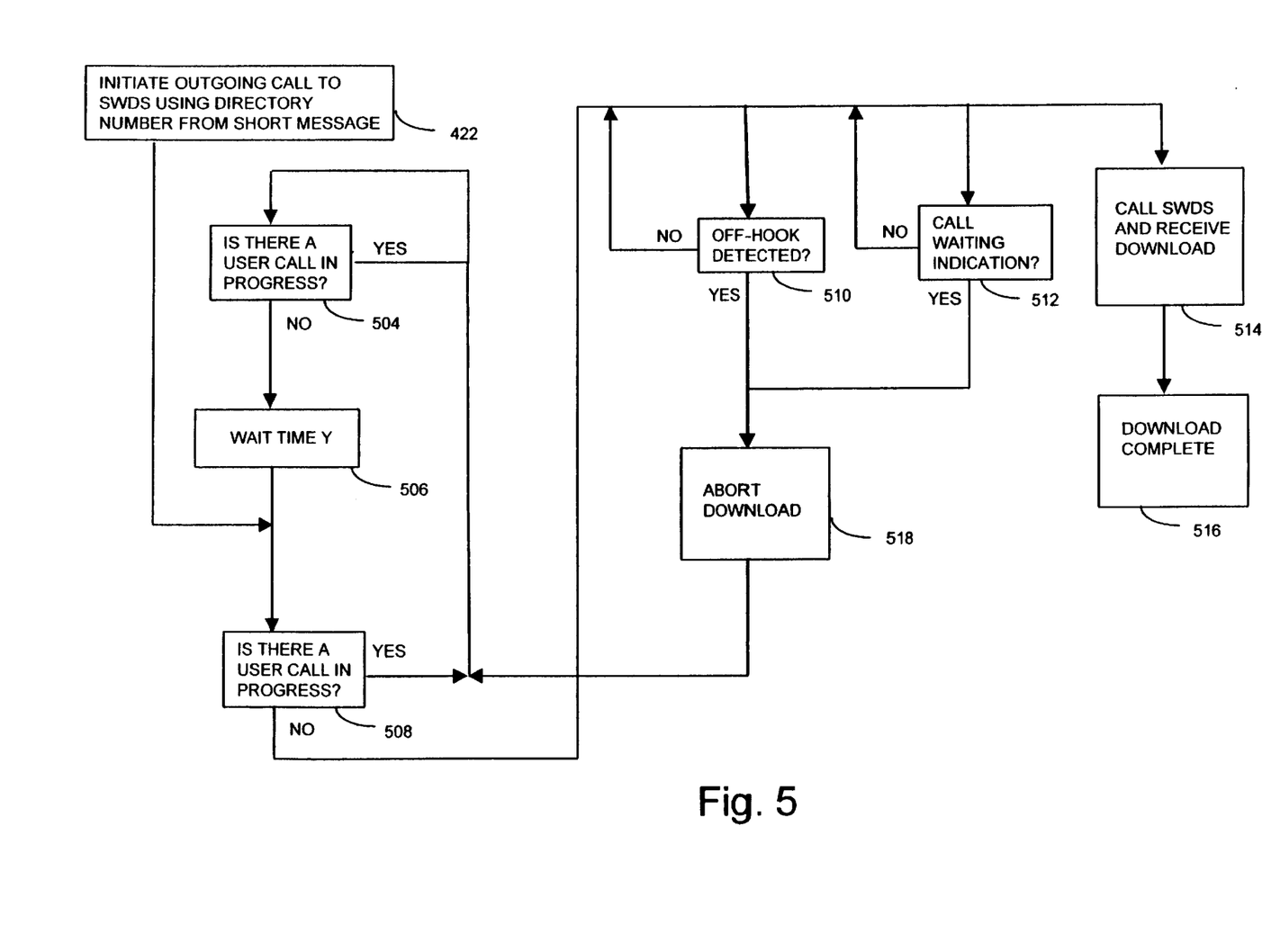
FIG. 5 is a flowchart illustrating the operation of the apparatus in performing a deference algorithm which is used to provide the user of the subscriber unit with uninterrupted service.

FIG. 5 is a flowchart illustrating the operation of the apparatus in performing a deference algorithm which is used to provide the user of the subscriber unit 106 with uninterrupted service, this despite the fact that software download requires the use of the same single bearer channel required for the user's communication. A software download at the subscriber unit 106 is normally prompted by the determination of a valid download prompt at step 422. Next, a check is performed in order to determine if there is a call already in progress at step 508. If a call is in progress then no download action occurs until the call ends.

The loop, at step 504, detects the end of the user's call. Once the call ends, the algorithm experiences a time delay for a period Y at step 506. The time interval Y is typically set to several minutes as there tends to be a high probability of follow-on calling activity after the end of a telephone call. In this manner, it is more efficient to wait several minutes after a call ends before initiating a download. If the download were to begin right away, there is typically a higher probability that the download would have to be aborted by another call. Once step 506 is completed, the algorithm continues to step 508.

In an alternate embodiment, step 422 could also proceed to step 504 instead of to step 508 without any loss in functionality. The consequence of such an alternate operational sequence is simply a minimum delay of Y for every download.

If no call is in progress, at step 508, the operation proceeds to step 514. While the download is in progress, there are two background activities, occurring at step 510 and at step 512. At step 510, a constant checking operation is performed in order to determine if an off hook condition of the telephone line I/F is present. Such an off hook condition would be an indication of an impending outgoing user call. At step 512, a constant checking operation is performed in order to determine if a call waiting indication from the mobile switching center is present, which is an indication of an impending incoming call. This call waiting indication signal can be sent over the associated signaling channel which is usable even while the bearer channel is being used for a download. If either step 510 or step 512 indicate an impending call, activity at step 514 is canceled and the download is aborted at step 518. The operation of the apparatus 100 then proceeds back to step 504, and the download will be re-attempted after any call activity ends.

At step 510, other indications could be used to determine if an impending outgoing call, rather than a detection of an off-hook condition, is present. For example, if the Subscriber unit 106 is a mobile terminal, activity on the keypad or a detection of the "SEND" or "TALK" key depression, to set up an outgoing call, could be utilized as criteria by which to determine the presence of an impending outgoing call.

The remote station or subscriber unit can decrypt any data with the utilized public key. In the event an unauthorized individual or a hacker obtains the public key, he or she would not have access to the private key, thereby preventing an unauthorized version of the download prompt from being issued. Further, since the prompt securely provides the remote station or subscriber unit with the authentic phone number of the server, and since the remote station or subscriber unit then initiates a call to the software download server, a great deal of security in the actual download process is achieved, since an unauthorized individual, or a hacker, would have to intercept an outgoing call to impersonate the software download server 112.

In an alternate embodiment, an additional digital signature can be provided at the software download server 112 in order to provide additional security. In this alternate embodiment, the software download server 112 computes a message digest on the software which is to be downloaded. The software download server 112 also encrypts the message digest with the private key which is utilized. The encrypted message is then downloaded with the software. The subscriber unit 106 decrypts the encrypted message digest by using the public key. The subscriber unit 106 then compares the result with the message digest which is calculated locally on the received software. If the results of the decrypted message and the locally calculated message digest match, the software is deemed to be authentic. If the same private key is utilized for a number of subscriber units, the software download server 112 need only calculate and encrypt the message digest once for a given software load and set of subscriber units.

The present invention may be utilized and/or find application in any network, wired or wireless, which may involve any type of remote customer-premises equipment. The present invention may be utilized in conjunction with subscriber units which connect to end-user terminals, or to integrated terminals, such as wireless telephones.

The present invention may also find application in systems where the link between the hub and remote device consists of a bearer channel and an associated (low-speed) signaling channel. The download may be prompted by the software download server by using the low speed channel. Thereafter, the remote station or subscriber unit may initiate a call to the software download server by using the bearer channel when there is no other calling activity in progress.

The present invention utilizes a deference algorithm which may be used by the remote station or subscriber unit in order to yield the use of the bearer channel to the user if the user needs the bearer channel during a software download. The deference algorithm may be utilized in order to provide the user of the subscriber unit with uninterrupted service.

The present invention may also utilize public key cryptography in order to authenticate the software download. The hub may use the private key in order to encrypt a signature which authenticates a software download prompt and/or the software itself.

While the present invention has been described and illustrated in various preferred embodiments, such descriptions and illustrations are merely illustrative of the present invention and are not to be construed to be limitations thereof. In this regard, the present invention encompasses any and all modifications, variations, and/or alternate embodiments, with the scope of the present invention being limited only by the claims which follow.

What is claimed is:

1. An apparatus for providing software to a subscriber device in a communication network, comprising:

a processor;

a database coupled to said processor; said database containing information about subscribers of a communication network; and a communication device, in electrical communication with said processor, for providing software to the subscriber device.

2. The apparatus of claim 1, further comprising:

a mobile switching computer for facilitating mobile communications in the communication network; and a base station subsystem device associated with said mobile switching computer, wherein said base station subsystem device communicates directly with the subscriber device.

3. The apparatus of claim 1, wherein said communication network comprises a plurality of subscriber devices.

4. The apparatus of claim 1, wherein said apparatus operates over a public switched telephone network.

5. The apparatus of claim 1, further comprising:

a storage device configured to store files which are available for transfer to the subscriber device.

6. The apparatus of claim 1, further comprising:

a signature processor configured to encrypt data to be transferred to the subscriber device.

7. The apparatus of claim 6, wherein said signature processor encrypts said data with a private key.

8. The apparatus of claim 3, wherein at least one of said plurality of subscriber devices comprises:

a processor for controlling the operation of said at least one of said plurality of subscriber devices; and a memory storage device coupled to said processor, wherein said memory storage device contains at least one of program data and configuration data.

9. The apparatus of claim 8, wherein said at least one of said plurality of subscriber devices further comprises:

a pointing device for pointing to one of program data and configuration data currently in use at said at least one of said plurality of subscriber devices.

10. The apparatus of claim 8, wherein said at least one of said plurality of subscriber devices further comprises:

a radio module device for facilitating communication between said subscriber processor and said apparatus.

11. The apparatus of claim 3, wherein at least one of said plurality of subscriber devices comprises at least one of:

a computer interface device for facilitating use of a computer at said at least one of said plurality of subscriber devices; and a telephone interface device for facilitating use of a telephone at said at least one of said plurality of subscriber devices.

12. The apparatus of claim 1, wherein said processor is a software download computer.

13. The apparatus of claim 7, wherein said data is decrypted with a public key at the subscriber device.

14. An apparatus for providing software to a subscriber device in a communication network, comprising:

means for controlling apparatus operation;

means, in electrical communication with said means for controlling, for storing information about subscribers of a communication network; and means, in electrical communication with said means for controlling, for providing software to the subscriber device.

15. The apparatus of claim 14, further comprising:

means for facilitating mobile communications in the communication network; and means for communicating directly with the subscriber device.

16. The apparatus of claim 14, wherein said communication network comprises a plurality of subscriber devices.

17. The apparatus of claim 14, wherein said apparatus operates over a public switched telephone network.

18. The apparatus of claim 14, further comprising:

means for storing files which are available to transfer to the subscriber device.

19. The apparatus of claim 14, further comprising:

means for encrypting data to be transferred to the subscriber device.

20. The apparatus of claim 19, wherein said encryption means encrypts said data with a private key.

21. The apparatus of claim 16, wherein at least one of said plurality of subscriber devices comprises:

means for controlling the operation of said at least one of said plurality of subscriber devices; and means for storing at least one of program data and configuration data, wherein said storing means is coupled to said controlling means.

22. The apparatus of claim 21, wherein said at least one of said plurality of subscriber devices further comprises:

means for pointing to one of program data and configuration data currently in use at said at least one of said plurality of subscriber devices.

23. The apparatus of claim 16, wherein said at least one of said plurality of subscriber devices further comprises:

means for facilitating communication between said apparatus control means and said subscriber device control means.

24. The apparatus of claim 16, wherein said at least one of said plurality of subscriber devices comprises at least one of:

means for facilitating use of a computer at said at least one of said plurality of subscriber devices; and means for facilitating use of a telephone at said at least one of said plurality of subscriber devices.

25. The apparatus of claim 14, wherein said processing means is a software download computer.

26. The apparatus of claim 19, wherein said data is decrypted with a public key at the subscriber device.

27. A method for transmitting software to a subscriber device in a communication network, comprising:

transmitting a first signal from a processor to the subscriber device;

initiating a communication channel between the subscriber device and the processor; and transmitting a second signal to the subscriber device, wherein said second signal contains software.

28. The method of claim 27, further comprising:

examining a subscriber database to identify a subscriber device requiring one of software and a software update.

29. The method of claim 27, further comprising:

calculating a first data set which is a function of at least one of a subscriber network address, a number for communication with the processor, and a random number.

30. The method of claim 27, wherein said first signal contains at least one of a subscriber device address, a number for communicating with the processor, a random number, and the encrypted data set.

31. The method of claim 27, wherein said first signal is transmitted over a signaling channel.

32. The method of claim 27, wherein said second signal is transmitted over a bearer channel.

33. The method of claim 27, further comprising:

determining if said first signal is an authentic signal.

34. The method of claim 27, further comprising:

storing the software in a memory device.

35. The method of claim 27, further comprising:

determining if the software download was successfully received at the subscriber device.

36. The method of claim 34, further comprising:

transmitting a third signal from the subscriber device to the processor, wherein said third signal contains information indicative of one of a successful software download operation and an unsuccessful software download operation.

37. The method of claim 27, further comprising:

changing a software pointing device to point to software received at the subscriber device with said second signal; and resetting the subscriber device to operate from the received software.

38. The method of claim 27, further comprising:

updating a subscriber database to indicate one of the occurrence of a software download and a current one of program data and configuration data utilized by the subscriber device.

39. The method of claim 27, further comprising:

re-attempting a software download if an unsuccessful download has occurred.

40. The method of claim 27, further comprising:

determining if the subscriber device is in use; and deferring the transmission of said second signal until the subscriber device is not in use.

41. The method of claim 27, further comprising:

delaying the transmission of said second signal for a pre-specified time period after the subscriber device is determined to not be in use.

42. The method of claim 27, further comprising:

identifying a subscriber device which requires one of software and a software update.

43. The method of claim 27, further comprising:

encrypting at least a portion of data in at least one of said first signal and said second signal at the processor with a private key.

44. The method of claim 27, further comprising:

decrypting at least a portion of data in at least one of said first signal and said second signal at the subscriber device with a public key.

45. The method of claim 27, further comprising:

detecting if the subscriber device is in use; and canceling the transmission of said second signal in response to a detection of the subscriber unit being in use.

46. The method of claim 27, further comprising:

detecting a transmission of a fourth signal to said subscriber device; and canceling the transmission of said second signal in response to said detection of said fourth signal.

47. An apparatus for providing software to a subscriber device in a communication network, comprising:

a transmitter for transmitting one a first signal and a second signal to the subscriber device; and a receiver for receiving a third signal from the subscriber device;

wherein said first signal prompts the subscriber device to initiate and establish a communication channel between said transmitter and the subscriber device.

48. The apparatus of claim 47, wherein said transmitter transmits said second signal to the subscriber device in response to the initiation of a communication channel.

49. The apparatus of claim 47, wherein said first signal is transmitted over a signaling channel.

50. The apparatus of claim 47, wherein said second signal is transmitted over a bearer channel.

51. The apparatus of claim 47, wherein said second signal contains software which is provided to the subscriber device.

52. The apparatus of claim 47, wherein said third signal is transmitted over a bearer channel.

* * * * *